Patented Jan. 30, 1923.

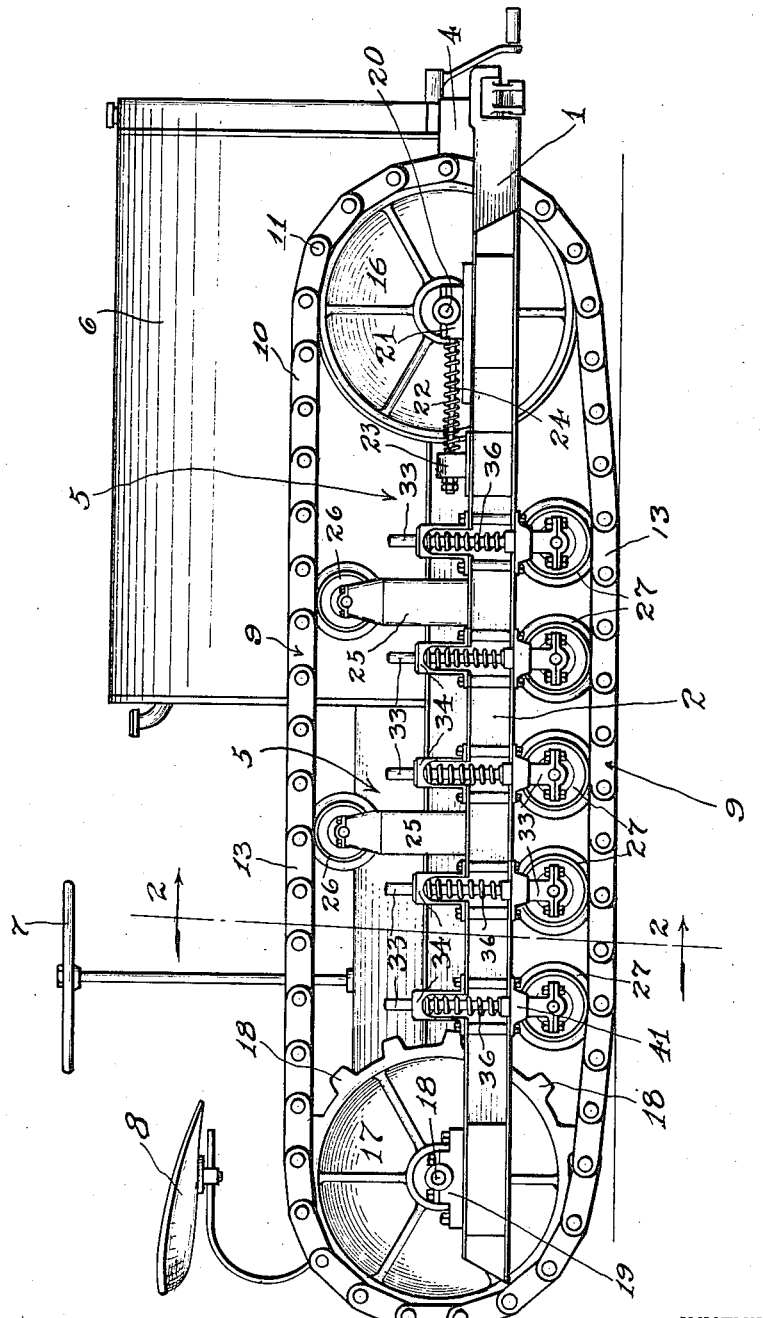

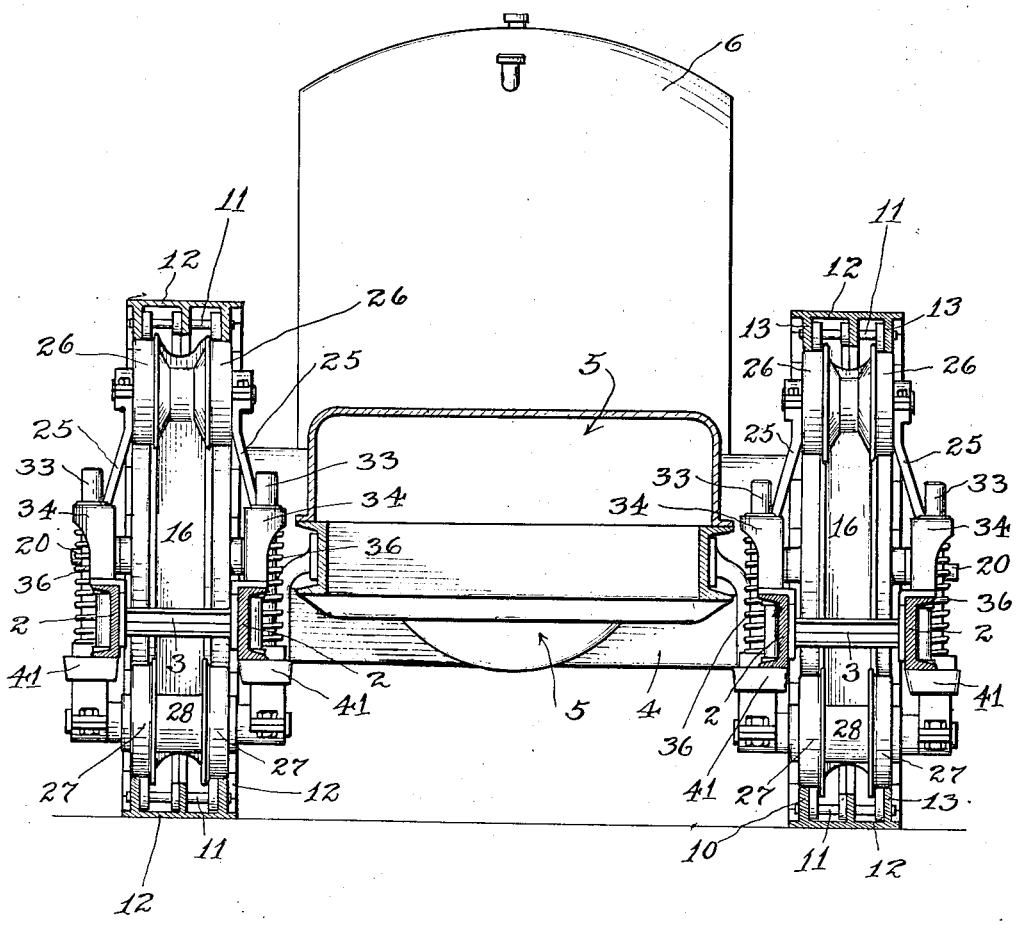

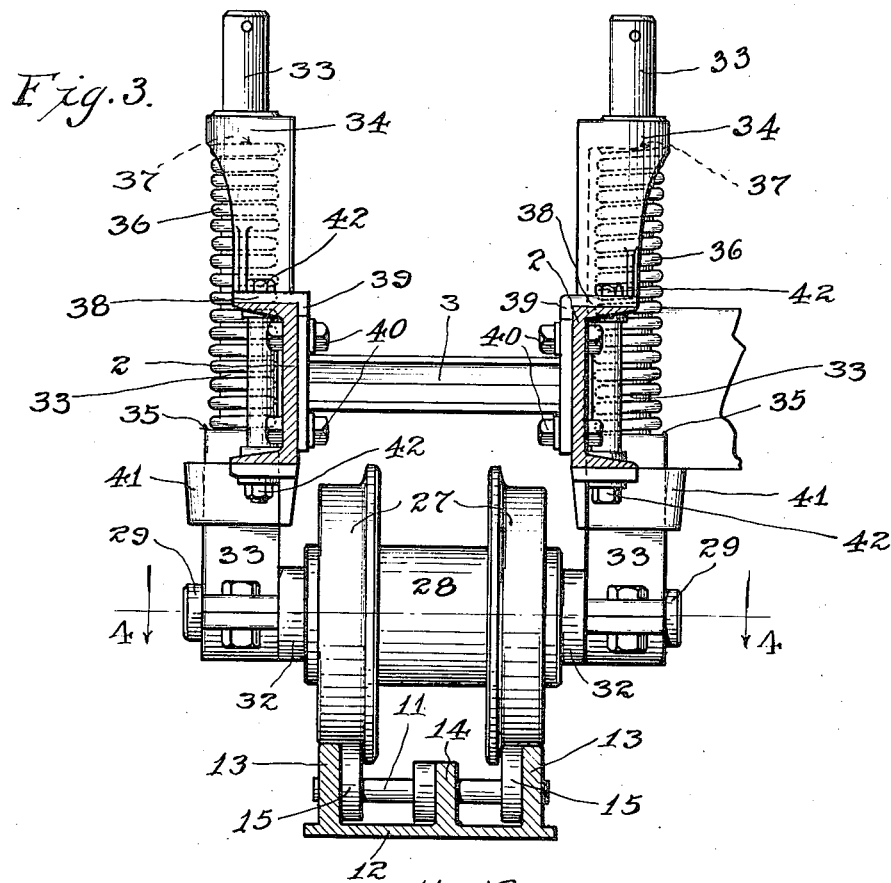
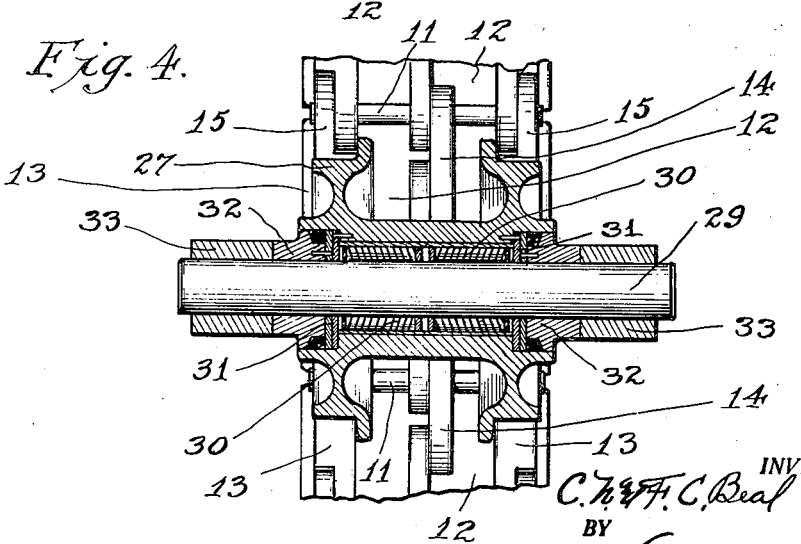

1,443,556

UNITED STATES PATENT OFFICE.

FAY C. BEAL AND CARROLL N. BEAL, OF SAN FRANCISCO, CALIFORNIA.

SUSPENSION DEVICE FOR ENDLESS TRACTOR FLIGHTS.

Application filed February 9, 1920. Serial No. 357,262.

*To all whom it may concern:*

Be it known that we, FAY C. BEAL and CARROLL N. BEAL, citizens of the United States, residing at the city and county of San Francisco and State of California, have invented certain new and useful Improvements in Suspension Devices for Endless Tractor Flights, of which the following is a specification.

This invention relates more particularly to tractors and that type of tractor in which a pair of broad endless tracks are laid down by the tractor as it advances and upon which broad tracks the weight of the tractor is supported.

The present improvement relates more particularly to a construction associated with the respective endless tracks, whereby the weight of the tractor is more evenly distributed on the track forming shoe sections, and a means is provided for more uniformly distributing the weight of the load on the endless track between the supporting wheels about which the track operates. A further object is to provide a construction whereby the track is at all times maintained under tension thereby preventing the accumulation of slack in the track which causes a jerky motion during the movement of the tractor; to provide a construction whereby the idler wheels supporting the front ends of the endless track sections are yieldably mounted enabling the same to act as absorbers on encountering abrupt surfaces, thereby relieving the tractor of considerable of the jar to which the same is subjected when in use. This construction also allows the centers between sprocket and front idler to shorten when shoes become packed with mud or foreign matter causing a shortening of the chain thus preventing breakage.

The invention consists primarily in providing a plurality of what may be termed double-flanged truck-wheels, each independently and yieldably supported throughout the length of the lower flight of the endless track whereby each truck wheel is capable of independent yieldable movement relatively to the others and is normally maintained in yieldable contact with the endless tracks.

With the above mentioned and other objects in view, the invention consists in the novel construction and combination of parts hereinafter described illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings wherein—

Fig. 1 is a view in side elevation of the preferred embodiment of our invention.

Fig. 2 is a sectional view taken on line 2—2, Fig. 1, viewed in the direction of the arrows.

Fig. 3 is an enlarged detailed sectional view of one set of yieldably held truck wheels; and Fig. 4 is a sectional view of one of the truck wheels and its bearings, taken on line 4—4 of Fig. 3.

Inasmuch as the present invention relates primarily to the endless track, the supporting and drive wheels therefor and the truck wheels, the other unnecessary parts have been eliminated from the drawings and to fully comprehend the invention reference is directed to the accompanying drawings wherein like characters of reference indicate corresponding parts in the respective views.

In the tractor 1 designates a frame of any suitable construction, the side members of which are preferably formed of parallel spaced horizontal channels 2, which are connected at intervals throughout their length by members 3. The opposite side frame members are connected preferably at the forward end of the tractor in any suitable manner as by a member 4, and between the side frame members is carried the power plant and drive supporting frame conventionally illustrated as at 5. 6 indicates the hood of the tractor, 7, one form of steering-means and 8 the operator's seat.

The tractor is supported by the endless flexible tracks 9 comprising the shoes 10, pivotally connected as at 11, and each shoe is provided with a relatively flat broad tread surface 12, strengthened or reinforced on its underside by the parallel spaced side and supporting flanges 13 and the central rib 14. The flanges 13 and the rib 14 at their ends are formed with tongues 15 which project beyond the ends of the shoes 12 and through which pass the fulcrum pins 11. This arrangement of the flanges 13 provides a support at the longitudinal side edges of the endless tracks on the inner or underface thereof and throughout the length of the track, as illustrated more clearly in Fig. 4 of the drawings.

At their opposite ends the respective tracks pass around the wheels 16 and 17, the wheel 16 being an idler wheel at the forward end of the tractor and the wheel 17 being a driving wheel at the rear end of the tractor, and which driving wheel is provided with peripheral teeth 18 for engaging the tracks between the pins 11 to impart movement thereto to drive the same. The wheels 16 and 17 are, as illustrated in Figs. 1 and 2 of the drawings, positioned between the spaced channels 2 and the wheel 17 is mounted on a power shaft 18 rotatably supported in bearings 19. The front or idler wheels 16 are supported by a shaft 20, which rests in bearings 21, which are capable of sliding movement longitudinally of the frame channels 2, and said bearings are forced toward the forward end of said channels 2 by the coiled springs 22, which abut against associated blocks 23 and which surround the adjustable guide shafts 24. The adjustment of the blocks 23 varies the tension of the spring 22, which normally forces the respective wheels 16 toward the front end of the frame channels 2, to maintain the respective endless tracks under tension. This mounting of the front or idler wheels 16 enables the same to absorb a shock or jar received by the tractor when the same encounters an abrupt surface or object during its forward movement without transmitting the same to the power plant and other mechanism of the tractor.

To support the upper flight of the respective tracks we mount on the standards 25 which rest at their lower ends on the members 2, Figs. 1 and 2 of the drawings, double flanged idler wheels 26, one flange of which cooperates with one of the flanges 13 of the endless track 9, Fig. 2 of the drawings. These idler wheels are preferably two in number on each side of the tractor and are arranged at spaced intervals between the drive wheels 17 and idler wheel 16. This construction of supporting the upper flight of the endless track relieves the strain on the track between the wheels 16 and 17, and enables the springs 22 to maintain the track fully extended.

To maintain the greater portion of the lower flight of the endless tracks 9 in contact with the ground surface to provide the maximum traction for the tractor, we mount in connection with each lower flight of the respective tracks a plurality of independently hung truck wheels, arranged at spaced intervals between the idler wheel 16 and drive wheel 17, and normally force the same downwardly below the tractor frame 1, maintaining the same under tension relative to the frame, and carrying a majority of the load on said truck wheels. We have illustrated the truck wheels as 5 to a side, and the constructing and mounting of all of the same being alike, a description of one is thought to suffice. The truck wheels as particularly disclosed in Figs. 3 and 4 of the drawings, consist of a double-flanged wheel structure 27, one flange of which cooperates with each of the track flanges 13. The double flanges 27 are connected by a hub 28 through which passes an axle 29 between which and the hub are positioned antifriction bearings 30. The bearings are maintained in position by suitable disks or washers 31 inserted into the ends of the hub and held in place by end members 32, positioned over the ends of the axle 29. The opposite ends of the axle 29 are mounted or clamped between a split collar formed on the lower ends of vertically disposed plungers 33, each operating in a tubular guide 34, the guides being positioned opposite each other, and one supported by each of the channel members 2. The upper end of the plungers is in the form of a cylindrical portion having a shoulder 35 at the base thereof and positioned and surrounding the upper cylindrical end of each plunger is a coiled spring 36, the lower end of which rests on the shoulder 35 and the upper end of which rests on the upper portion 37 of the tubular part of the guide 34. The tubular guide 34 is preferably formed in two sections, the upper section of which is provided with a supporting flange 38 resting on the upper surface of the channels 2, and rearwardly and downwardly from which extends a securing flange 39, which lies adjacent the inner face of the channel 2, said portion 39 being secured to the channel by bolts 40. The lower section of the tubular guide, and designated by the numeral 41, is in the form of an annular member secured to the lower or under edge of the channel 2 by bolts 42 which pass vertically through the flanges of the channels. The construction and mounting of the respective truck wheels provides an independent tension device for each pair of flanged bearing surfaces, and the springs 36 normally forcing the plungers 33 downwardly relatively to the tractor frame 1 cause said truck wheels to normally maintain the load of the tractor and to evenly distribute the same throughout the length of the lower flight of the endless track lying between the idler wheels 16 and driving wheel 17.

It wil be apparent that the present construction permits the centers between the drive and driven wheels to shorten, should for any reason the track become shortened due to the packing of foreign material either between the shoes or between the periphery of any truck supporting idler, or drive wheel and the inner periphery of the track. This yielding movement by the center of one of the track supporting wheels relative to the other enables this commonly termed packing of the track to take place and be relieved by the tractor operator without injuring the tractor or breaking the track which is common in present installations.

Having thus described our invention what we claim is:

A track frame for a tractor, comprising a pair of spaced angular side bars arranged in parallel relation with connecting means therebetween, standards rigidly connected to said side bars extending substantial distances thereabove, rollers journaled in said standards, guide brackets fitted to said side bars and projecting outwardly beyond the vertical plane thereof from the upper and lower portions of said side bars, plungers adapted to reciprocate in openings in said guide brackets, shoulders on said plungers and coil springs surrounding said plungers and partially housed within said brackets, the upper ends of said springs engaging a portion of the upper bracket, with the lower ends of the springs coacting with a shoulder on each of said plungers, rollers journaled in the lower ends of the plungers, and an endless track travelling around said rollers and the rollers carried on said standards.

In testimony we have signed our names to this specification in the presence of two subscribing witnesses.

FAY C. BEAL.
CARROLL N. BEAL.

Witnesses:
N. A. ACKER,
D. B. RICHARDS.